United States Patent [19]

Rader

[11] Patent Number: 5,076,628
[45] Date of Patent: Dec. 31, 1991

[54] FOOD HANDLING TONGS WITH SERRATED BLADE SLOTS

[75] Inventor: James A. Rader, Branson, Mo.

[73] Assignee: Peoples Leisure Products, Inc., Branson, Mo.

[21] Appl. No.: 569,205

[22] Filed: Aug. 20, 1990

[51] Int. Cl.⁵ .............................................. A47J 43/28
[52] U.S. Cl. .................................... 294/8; 294/118
[58] Field of Search ............... 294/7, 8, 8.5, 11, 16, 294/25, 28, 50.8, 106, 118, 902; 30/124, 142, 325, 351; 99/380, 394, 450; 100/213, 234, 235; D7/637, 666, 683, 686–688

[56] References Cited

U.S. PATENT DOCUMENTS

| 309,049 | 12/1884 | Hervey | 294/106 X |
| 2,801,877 | 8/1957 | Hetrick | 294/106 |
| 3,028,190 | 4/1962 | Thomas | 294/118 |
| 3,361,468 | 1/1968 | Case | 294/8 |
| 3,964,775 | 6/1976 | Boyd | 294/16 |
| 4,002,365 | 1/1977 | Rader | 294/8 |
| 4,577,900 | 3/1986 | Chasen | 294/16 X |

FOREIGN PATENT DOCUMENTS 70817  5/1942  Czechoslovakia .................. 294/7

Primary Examiner—Johnny D. Cherry
Attorney, Agent, or Firm—James D. Hall

[57] ABSTRACT

Tongs for handling food items upon a grill in which the food gripping plates of the tongs are displaced laterally as well as apart when open to enable the user of the tongs to see the food item as it is being gripped by the tongs. The tongs plates each include a pair of serrated teeth defining slots. The teeth formed by the slots engage the food item as the plates are positioned in a food-gripping orientation relative to one another to restrict movement of the food item relative to the tongs.

2 Claims, 2 Drawing Sheets

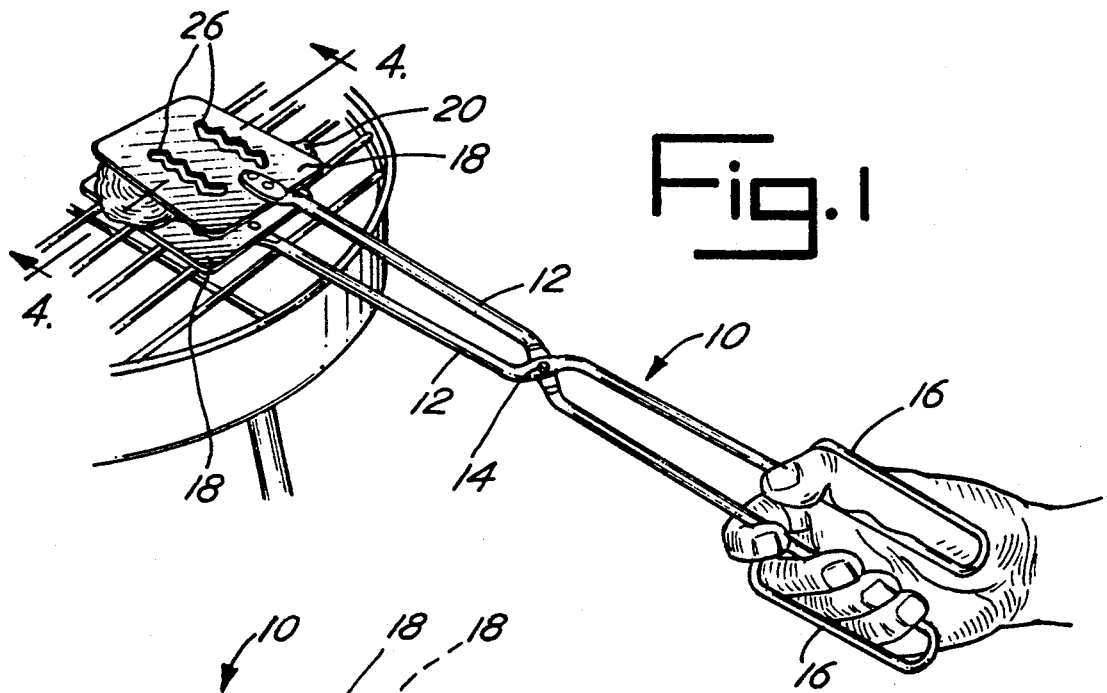
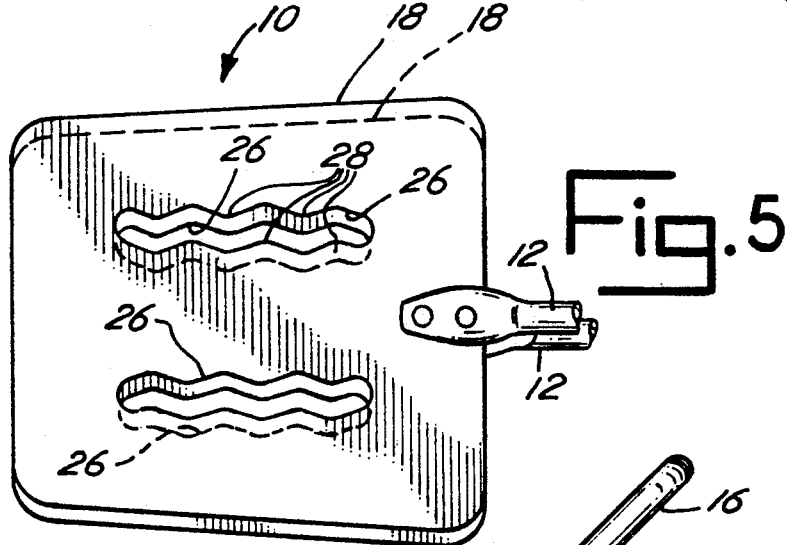
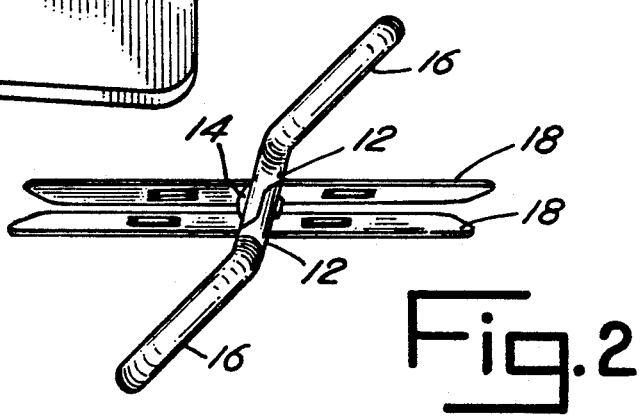

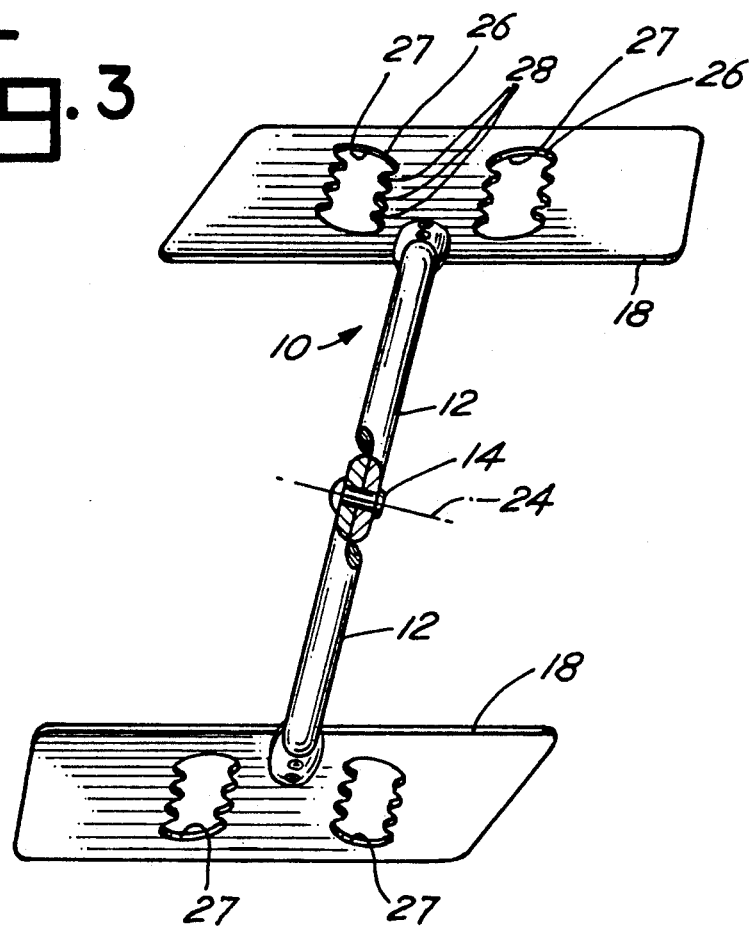
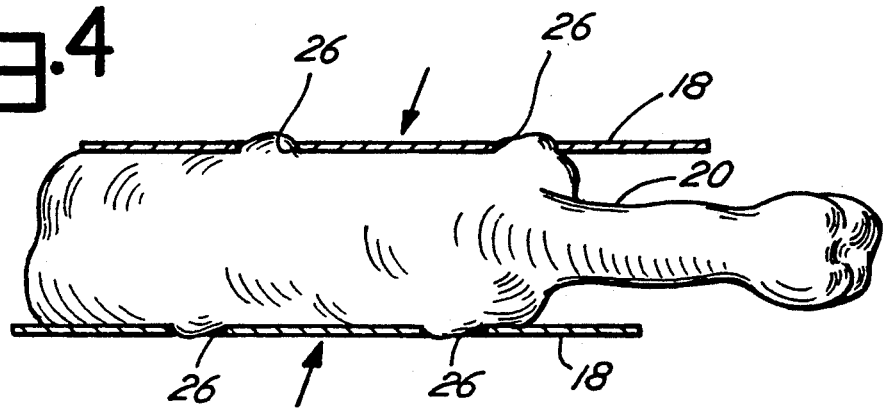

FOOD HANDLING TONGS WITH SERRATED BLADE SLOTS

FIELD OF THE INVENTION

This invention relates to tongs utilized for gripping food products on a grill.

BACKGROUND OF THE INVENTION

Tongs for gripping food items on a grill including upper and lower plates connected to arms for grasping food objects therebetween are known. An example of such food handling tongs is illustrated in U.S. Pat. No. 4,002,365, issued Jan, 11, 1977. A problem experienced in the prior art food handling tongs is that irregularly shaped food objects often are squeezed out from between the plates by the action of the tongs. This problem is especially noticed when using the food handling tongs to grasp chicken parts or similar rounded skinned food objects.

SUMMARY OF THE INVENTION

The food handling tongs of this invention eliminates the problem experienced with the prior food handling tongs by providing a pair of serrated slots in the upper and lower plates of the tongs. The projections or teeth formed by the serrated slots engage or bite into the food product when the two plates are squeezed together by the tongs arms. Further, as in the previous food handling tongs, the plates are angled relative to the tongs'-handles and intersect one another during the closing at other than a 90 degree angle such that the two plates slide relative to one another along the food product when squeezed to the closed position. The sliding action of the plates relative to one another also aids in the biting action of the slot teeth in the plates.

Accordingly, it is an object of the invention to provide tongs for grasping and turning food items upon a grill.

Another object of this invention is to provide for tongs having upper and lower plates with serrated slots for grasping the food product.

Other objects for this invention will become apparent upon a reading of the invention's description taken with the accompanying drawings.

BRIEF DESCRIPTION OF THE DRAWINGS

FIG. 1 is a perspective view of the tongs being utilized for handling a food item upon a grill.

FIG. 2 is an end view of the tongs as seen from the tong handles.

FIG. 3 is a sectional view of the tongs in an open position taken at the pivot point of the tong arms.

FIG. 4 is a sectional view taken from line 4—4 of FIG. 1.

FIG. 5 is a fragmented top plan view of the tong plates in their closed position.

DESCRIPTION OF THE PREFERRED EMBODIMENT

The preferred embodiment herein described is not intended to be exhaustive or to limit the application to the precise form disclosed. Rather, it is chosen in order to enable others skilled in the art to utilize its teachings.

Referring now to the drawings, tongs 10 include a pair of arms which are pivotally connected together by pin 14. One corresponding end of each arm 12 is formed into a handle 16 and the opposite end of each arm carries a plate 18. Pivotal movement of the arms 12 about pin 14 causes plates 18 to shift between the generally superimposed food grasping or closed position shown in FIGS. 1, 2, 4 and 5 and an open position such as that shown in FIG. 3.

Plates 18 are laterally offset when the tongs are in the open position as shown in FIG. 3. As the tongs are closed to bring plates 18 together in a food grasping position, the upper plate 18 shifts toward and laterally over the lower plate 18. This lateral displacement of the upper plate 18 relative to the lower plate 18 when the tongs are open enables the user of the tongs to more clearly see the food item 20 as the lower plate is being slid under the food item in preparation to be grasped and turned over or removed from a cooking surface. This movement of the upper plate 18 relative to the lower plate 18 is effected by having the pivot axis 24 defined by pin 14 of arms 12 angled relative to the plane of each of the plates. This angular relationship causes arms 12 when pivoted about pin 14 to move in a plane which intersects the plane of plates 18 at an other than 90 degree angle. As thus far described, tongs 10 of the present invention are substantially similar to those described in and claimed in U.S. Pat. No. 4,002,365 incorporated herein by reference. A more thorough understanding of the basic operation of the tongs may be had by reference to the incorporated patent.

The tongs 10 of the present invention include a pair of longitudinal aligned serrated slots 26 formed in each plate 18. The edge 27 of each slot 26 is formed into a plurality of projections or teeth 28. As illustrated in the figures and previously described, plates 18 in their open position are laterally offset in one direction relative to one another. However, as further illustrated in the figures, plates 18 in their closed position are laterally offset in the opposite direction. Therefore, it should be understood that the plates during closing laterally shift relative to one another. When a food object is presented between the plates 18 and the upper and lower plates are urged toward their closed position, the upper plate 18 slides across the upper surface of the food product. As the upper plate 18 slides laterally toward the lower plate 18, teeth 28 formed by serrated slots 26 bite into the food product to restrict movement of the food product as seen in FIG. 4. The biting of teeth 28 is enhanced by portions of the food product being squeezed through the slots 26 as the plates 18 are forced together. In the preferred embodiment, there are six protrusions or teeth 28 per slot for biting into the food product.

It is to be understood that the invention is not to be limited by the details above given, but may be modified within the scope of the appended claims.

What I claim is:

1. Tongs for handling a food item upon a grill, said tongs comprising a pair of arms each having first and second ends, said arms overlapping at a corresponding location between said first and second ends, means pivotally connecting said arms together at said corresponding location, said first end of each arm being formed into cooperating handle means, a pair of plate members, one said plate member connected to each arm at its second end, said tongs having a closed food item gripping position wherein said plate members spacedly overlie one another in a generally superimposed orientation and an open position wherein said plate members are laterally offset and further spaced apart, said handle means for pivotally moving said arms about said pivot connecting means, said pivot means including means for shifting said arms in a plane extending at an acute angle to the plane of each plate member causing said plate members to be shifted laterally relative to each other between their open and closed positions with said lateral offset between the plate members when said tongs are in their open position permitting viewing of the food item as said item is being gripped, each of said plate members including a serrated slot, each serrated slot defined by an edge forming a plurality of spaced protrusion means, said protrusion means for engaging a food item positioned between the plate members as said plate members are shifted from their open position toward their closed food item gripping position to securely retain the food item between the plate members in said closed position.

2. Tongs for handling a food item upon a grill, said tongs comprising a pair of arms each having first and second ends, said arms overlapping at a corresponding location between said first and second ends, means pivotally connecting said arms together at said corresponding location, said first end of each arm being formed into cooperating handle means, a pair of plate members, one said plate member connected to each arm at its second end, said tongs having a closed food item gripping position wherein said plate members spacedly overlie one another in a generally superimposed orientation and an open position wherein said plate members are laterally offset and further spaced apart, said handle means for pivotally moving said arms about said pivot connecting means, said pivot means including means for shifting said arms in a plane extending at an acute angle to the plane of each plate member causing said plate members to be shifted laterally relative to each between their open and closed positions, each of said plate members including a serrated slot, each serrated slot defined by an edge forming a plurality of spaced protrusion means, said protrusion means for engaging a food item positioned between the plate members as said plate members are shifted from their open position toward their closed food item gripping position to securely retain the food item between the plate members in said closed position, said protrusion means of each plate member being coplanar with the plate member.

* * * * *